US010025886B1

(12) United States Patent
Rublee et al.

(10) Patent No.: US 10,025,886 B1
(45) Date of Patent: Jul. 17, 2018

(54) METHODS AND SYSTEMS FOR USING PROJECTED PATTERNS TO FACILITATE MAPPING OF AN ENVIRONMENT

(71) Applicant: X Development LLC, Mountain View, CA (US)

(72) Inventors: Ethan Rublee, Mountain View, CA (US); Hauke Malte Strasdat, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 482 days.

(21) Appl. No.: 14/870,626

(22) Filed: Sep. 30, 2015

(51) Int. Cl.
*G06F 17/50* (2006.01)
*G01B 11/25* (2006.01)

(52) U.S. Cl.
CPC ............ *G06F 17/50* (2013.01); *G01B 11/254* (2013.01)

(58) Field of Classification Search
CPC .................. G06F 17/50; G01B 11/254; G06K 9/00201–9/00214; G06K 9/20–9/2036; G06K 2009/2045; G06K 9/46–9/4609; G06K 9/6288; G06K 9/34; G06K 9/36; G06K 9/40; G06K 9/78–9/82; G06T 7/0059; G06T 7/0075; G06T 7/521; G06T 7/00; G06T 2219/00; G06T 7/0004–7/001; G06T 7/0008; G06T 7/0065; G06T 7/40; G06T 2207/10012–2207/10021; G06T 2207/10028; G06T 2207/10048; G06T 2207/20136; G06T 2207/30108–2207/30112;

(Continued)

(56) References Cited

U.S. PATENT DOCUMENTS 5,525,883 A 6/1996 Avitzour
7,706,917 B1 * 4/2010 Chiappetta ........... G05D 1/0225
700/245

(Continued)

OTHER PUBLICATIONS

Unpublished U.S. Appl. No. 14/541,576, filed Nov. 14, 2014, with inventors Ethan Rublee, entitled "Methods and Systems for Providing Landmarks to Facilitate Robot Localization and Visual Odometry".

(Continued)

Primary Examiner — Bao Long T Nguyen
(74) Attorney, Agent, or Firm — McDonnell Boehnen Hulbert & Berghoff LLP

(57) ABSTRACT

Methods and systems for using projected patterns to facilitate mapping of an environment are provided herein. A computing system may cause fixedly-posed projectors to each provide, onto a respective area of the environment, a predetermined respective distinct pattern. The system may determine respective poses of the projectors, and further determine a map of the environment that identifies, for each distinct pattern, respective locations on one or more surfaces in the environment on which the distinct pattern is detectable. Based on sensor data the system may identify a portion of a particular distinct pattern in the environment. The system may use the map and the respective pose of a particular projector that is providing the particular pattern to make a determination that the portion is located at a new, different location compared to the map. The system may then transmit an output signal indicating the determination.

20 Claims, 10 Drawing Sheets

(58) Field of Classification Search
CPC ............ G06T 2207/30148–2207/30152; G06T 2207/30164; B25J 9/1694; B25J 9/1697; B25J 19/02–19/023; B25J 19/04; G05B 2219/37009; G05B 2219/37017; G05B 2219/37567; G05B 2219/37572; G05B 2219/39369; G05B 2219/40136; G05B 2219/40603; G05B 2219/39393; Y10S 901/44; Y10S 901/46–907/47; Y10S 901/50
USPC ........... 700/250, 253–254, 258–259; 901/44, 901/46–47, 50; 318/568.16, 318/568.22–568.23; 382/153, 173, 174
See application file for complete search history.

(56) References Cited

U.S. PATENT DOCUMENTS

| | | | |
|---|---|---|---|
| 7,720,554 B2* | 5/2010 | DiBernardo | G01S 5/163 356/139.03 |
| 7,957,583 B2 | 6/2011 | Boca et al. | |
| 7,974,738 B2 | 7/2011 | Bruemmer et al. | |
| 8,773,514 B2 | 7/2014 | Gharib et al. | |
| 8,929,608 B2 | 1/2015 | Takizawa | |
| 8,970,693 B1 | 3/2015 | Chang et al. | |
| 9,002,511 B1 | 4/2015 | Hickerson et al. | |
| 2007/0260394 A1 | 11/2007 | Dean | |
| 2011/0025853 A1* | 2/2011 | Richardson | H04N 5/2256 348/159 |
| 2011/0125323 A1* | 5/2011 | Gutmann | G05D 1/0234 700/258 |
| 2011/0196563 A1 | 8/2011 | Yturralde et al. | |
| 2012/0239191 A1 | 9/2012 | Versteeg et al. | |
| 2013/0268246 A1* | 10/2013 | Gordin | G06F 17/50 703/1 |
| 2014/0247354 A1* | 9/2014 | Knudsen | B60R 1/00 348/148 |
| 2015/0097931 A1* | 4/2015 | Hatzilias | G01B 11/2513 348/50 |
| 2016/0221503 A1* | 8/2016 | Krokel | G06T 5/006 |
| 2017/0039756 A1* | 2/2017 | Moule | H04N 5/74 |
| 2017/0205061 A1* | 7/2017 | Broers | F21V 21/15 |

OTHER PUBLICATIONS

Lepetit et al., "EPnP: An Accurate O(n) Solution to the PnP Problem", Int J Comput Vis, pp. 1-12, Apr. 15, 2008.

Fischler et al., "Random Sample Consensus: A Paradigm for Model Fitting With Applications to Image Analysis and Automated Cartography", SRI International, Technical Note 213, Mar. 1980.

Triggs et al., "Bundle Adjustment—A Modern Synthesis", pp. 1-71, 2000.

* cited by examiner ured respective distinct pattern. The system may further include a means for determining respective poses of the plurality of projectors. The system may still further include a means for determining a map of the environment that identifies, for each distinct pattern, respective locations on one or more surfaces in the environment on which the distinct pattern is detectable. The system may still further include a means for, based on sensor data from at least one sensor, identifying a portion of a particular distinct pattern in the environment. The system may still further include a means for using the map and the determined respective pose of a particular projector of the plurality that is providing the particular distinct pattern to make a determination that the portion is located in the environment at a new location different from the respective location identified by the map for the particular distinct pattern. The system may yet still further include a means for transmitting an output signal indicating the determination that the portion is located in the environment at the new location different from the respective location identified by the map for the particular distinct pattern.

METHODS AND SYSTEMS FOR USING PROJECTED PATTERNS TO FACILITATE MAPPING OF AN ENVIRONMENT

BACKGROUND

Robotic systems that occupy a physical environment, such as control systems for robotic devices, may maintain a map of the environment in order to facilitate robotic and/or human action within the environment. In some cases, a robotic system may acquire visual information about the environment and use that information to construct the map, which may include locations of obstacles, robotic devices, and other objects, for instance. Robotic devices may then navigate through and perform actions in the environment using the constructed map.

SUMMARY

Example systems and methods may provide for using projected patterns in an environment to facilitate mapping of the environment. More specifically, a system may be configured to use projectors that are fixedly posed in the environment to provide predetermined respective distinct patterns onto various areas in the environment. Using the projected distinct patterns, one or more sensors configured to observe the environment, and determined poses (i.e., positions and orientations) of the projectors, the system may determine a map that identifies respective locations on various surfaces in the environment on which the distinct patterns are detectable. The system may then use the map as a reference to determine when the environment has changed. In particular, the system may detect a portion of one of the distinct patterns and, given the map's indication of the surface(s) in the environment on which the portion should be detectable, the system can determine whether the portion is located in the environment at a new, different location than the location indicated by the map.

In one aspect, the present application describes a method performed by a computing system having one or more processors and a memory. The method may involve causing a plurality of projectors that are fixedly posed in an environment to each provide, onto a respective area of the environment, a predetermined respective distinct pattern. The method may further involve determining respective poses of the plurality of projectors. The method may still further involve determining a map of the environment that identifies, for each distinct pattern, respective locations on one or more surfaces in the environment on which the distinct pattern is detectable. The method may still further involve, based on sensor data from at least one sensor, identifying a portion of a particular distinct pattern in the environment. The method may still further involve using the map and the determined respective pose of a particular projector of the plurality that is providing the particular distinct pattern to make a determination that the portion is located in the environment at a new location different from the respective location identified by the map for the particular distinct pattern. The method may yet still further involve transmitting an output signal indicating the determination that the portion is located in the environment at the new location different from the respective location identified by the map for the particular distinct pattern.

In another aspect, the present application describes a computing system. The computing system may include a plurality of projectors that are fixedly posed in an environment, at least one sensor, at least one processor, and data storage comprising instructions executable by the at least one processor to cause the computing system to perform operations including the method described above.

In still another aspect, the present application describes a non-transitory computer readable medium having stored thereon instructions that, upon execution by a computing system, cause the computing system to perform operations comprising the method described above.

In yet another aspect, a system is provided that includes a means for causing a plurality of projectors that are fixedly posed in an environment to each provide, onto a respective area of the environment, a predetermined respective distinct pattern. The system may further include a means for determining respective poses of the plurality of projectors. The system may still further include a means for determining a map of the environment that identifies, for each distinct pattern, respective locations on one or more surfaces in the environment on which the distinct pattern is detectable. The system may still further include a means for, based on sensor data from at least one sensor, identifying a portion of a particular distinct pattern in the environment. The system may still further include a means for using the map and the determined respective pose of a particular projector of the plurality that is providing the particular distinct pattern to make a determination that the portion is located in the environment at a new location different from the respective location identified by the map for the particular distinct pattern. The system may yet still further include a means for transmitting an output signal indicating the determination that the portion is located in the environment at the new location different from the respective location identified by the map for the particular distinct pattern.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1A:
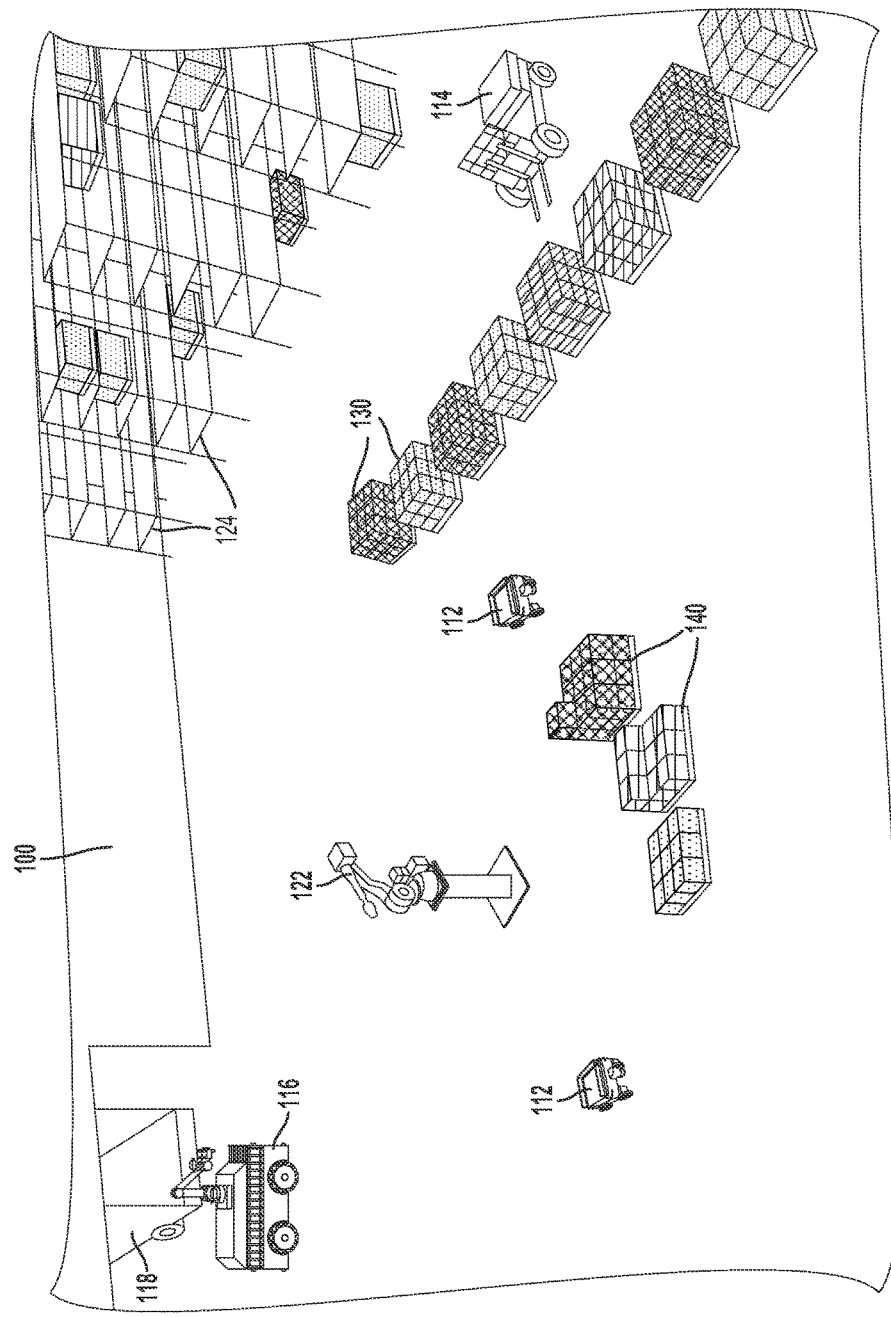
FIG. 1A shows a robotic fleet, according to an example embodiment.

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In the following description, the terms "robotic device" and "robotic manipulator" may be used interchangeably herein to refer to a robotic device that is configured to manipulate (e.g., grab, move, drop, etc.) objects.

Further, the terms "workplace," "workspace," and "warehouse" may refer herein to any physical environment in which boxes or other objects may be manipulated, processed, and/or stored by robotic devices. In some examples, a warehouse may be a single physical building or structure, which may additionally contain certain fixed components, such as pallet racks for storing pallets of objects.

Still further, the terms "sensor," "camera," or "optical sensor" may be used interchangeably herein and may refer to device or devices (mono or stereo arrangements) configured to perform three-dimensional (3D) image sensing, 3D depth sensing, two-dimensional (2D) image sensing, 2D depth sensing (i.e., 2D image and corresponding depth map), and/or other types of sensing of a physical environment of the device.

Yet still further, a "map" refers herein to information representative of a positioning of elements in a particular area of an environment, and/or representative of a relationship of certain elements to other elements or to the environment. Within example embodiments, a map is a digital map, determined by collecting and compiling data representative of relationships between elements in the given environment. This data can take the form of a list or other record of elements in the given environment, such as a list including a respective location of each element in the given environment (e.g., 2D and/or 3D coordinate points). Additionally or alternatively, this data can be formatting such data into a virtual form, such as a virtual 2D or 3D image (e.g., a 3D model reconstruction of the environment). A map can be a real-time or non-real-time representation of the elements and environment at issue, detailing such elements, the environment, and/or points of interest on such elements and/or in the environment (e.g., the 2D or 3D location of surfaces in the environment that include projected patterns).

Still further, a "model" refers herein to an n-dimensional virtual reconstruction of a physical environment, such as the physical environment of the robotic manipulator that includes the set of objects. Within examples, the model may be a 3D volumetric model of the set of objects. Within additional examples, the model may be a 2D image of a façade of the set of objects, such as an orthographically-projected color/intensity image, depth image, or normal image, or another type of 2D image.

An example arrangement includes a control system for a robotic fleet that occupies a workspace environment, such as a warehouse. The system may be operable to control aspects of various devices in the warehouse, including static and dynamic robotic devices and sensors. Further, the system may maintain a map of the warehouse, and the map may be used by the system to control robotic operation in the warehouse, such as robotic navigation, localization, vision, visual odometry, obstacle avoidance, and object manipulation. To facilitate this in practice, for instance, the system may detect objects present in the warehouse and use the detected objects as a basis for determining a map of the warehouse. In some scenarios, objects present in the warehouse may be added, removed, or otherwise change over time, and thus the system may adapt to account for such changes in order to maintain the map of the warehouse.

Within examples, a warehouse may be retrofitted with a network of projectors each configured to provide features (i.e., "texture" or other discernable structures found in images, such as points, edges, and fiducial markers, that can be used to facilitate computer vision operation, such as pattern recognition, feature detection, feature matching, object reconstruction, etc.) onto surfaces in the warehouse, such as features found in patterns of structured light. In particular, each projector may be configured to provide substantially static features onto surfaces in the warehouse. Further, the warehouse may be retrofitted with one or more cameras configured to detect such features and provide the system with data representative of such detected features, which the system may then use as a basis for maintaining the map of the warehouse. Such an arrangement may provide reduced cost and/or increased robustness compared to alternative arrangements.

Provided herein is an example method for mapping a warehouse using fixedly-posed projectors. In particular, a computing system may cause a network of fixedly-posed projectors in a warehouse (e.g., attached to the ceiling of the warehouse) to each project a predetermined respective distinct pattern of light onto respective areas in the warehouse. Each pattern of light may be comprised of one or more distinct "sub-patterns" (i.e., features) that can be detected on various surfaces, such as planar or near-planar surfaces. Further, the system may determine the pose of each projector with respect to a given global reference point. Then, using these projector poses and using fixedly-posed and/or moving sensors in the warehouse, the system may determine a map of the warehouse that identifies, for each projected pattern, respective locations on one or more surfaces (e.g., the floor, walls, boxes, etc.) on which the pattern is detectable. For instance, the system may use the poses of the projectors and sensor(s) to facilitate triangulation or other methods to determine 3D coordinate point locations of each feature of each pattern. The system may then construct a 3D map of the surfaces in the warehouse on which the features are located and/or store the determined 3D locations as a non-visual list. Within examples, the map may further include data identifying the determined poses of each projector.

Furthermore, in accordance with the example method, the determined map may enable the system to engage in a process where the system detects changes in the warehouse. As part of this process, the system may use monocular and/or stereo images acquired by one or more static and/or moving sensors to detect a portion of a particular pattern in the warehouse. The detected portion may include one or more distinct features of the particular pattern. This process may then involve the system using the map, the pose of the projector that is projecting the particular pattern, and the images of the warehouse to verify where in the warehouse the portion was located when the system determined the map and thereby determine whether the portion has changed locations to a new, different location in the warehouse. Such a change in location may occur for various reasons, including, for instance, an object (e.g., a box or autonomous robot)

moving into or out of the location identified by the map where the portion was initially located, thus causing the portion to fall onto a surface that is higher or or lower in elevation than the elevation indicated by the map.

The system may then transmit an output signal indicating the determined change. For example, the system may transmit the output signal to a robotic device so as to inform the robotic device of the change, and perhaps to facilitate subsequent robotic action in the warehouse, such as directing the robotic device to avoid the new location or travel to the new location. As another example, the system may transmit the output signal to a computing device (e.g., a smartphone, tablet computer, laptop computer, etc.) of a warehouse employee so as to inform the employee of the change.

Moreover, the system may determine that this change has occurred because an object is moving through the environment and may use this change and/or other determined changes in the warehouse to detect the motion of the moving object through the warehouse, such as by iteratively performing the above-noted process with respect to other portions of other patterns. Moreover, the system may use this change and/or other determined changes to the warehouse to periodically or continuously update the map, such as by updating the 3D locations identified by the map or performing 3D reconstruction of the surface(s) at the new location of the portion.

Various additional examples are described below, therefore the above examples are not meant to be limiting.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
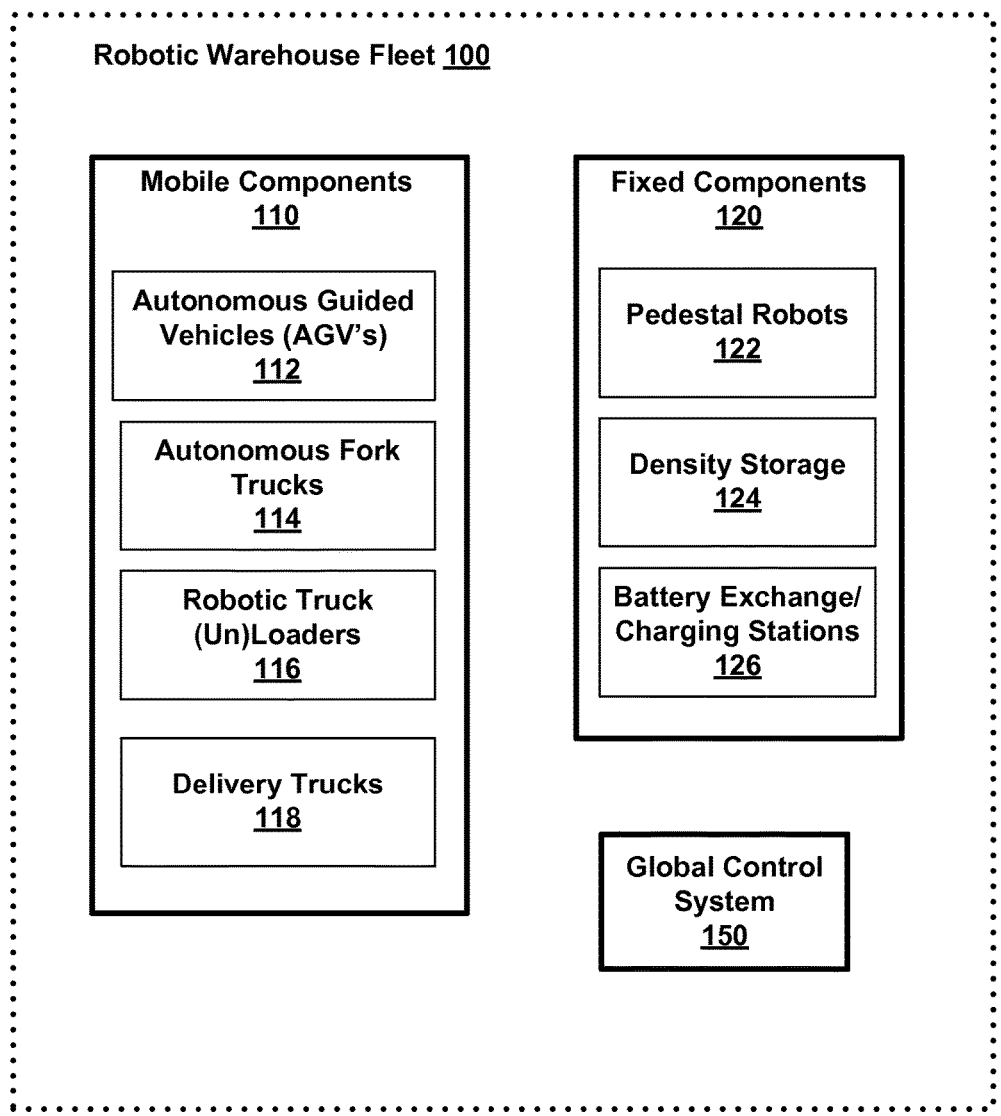
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
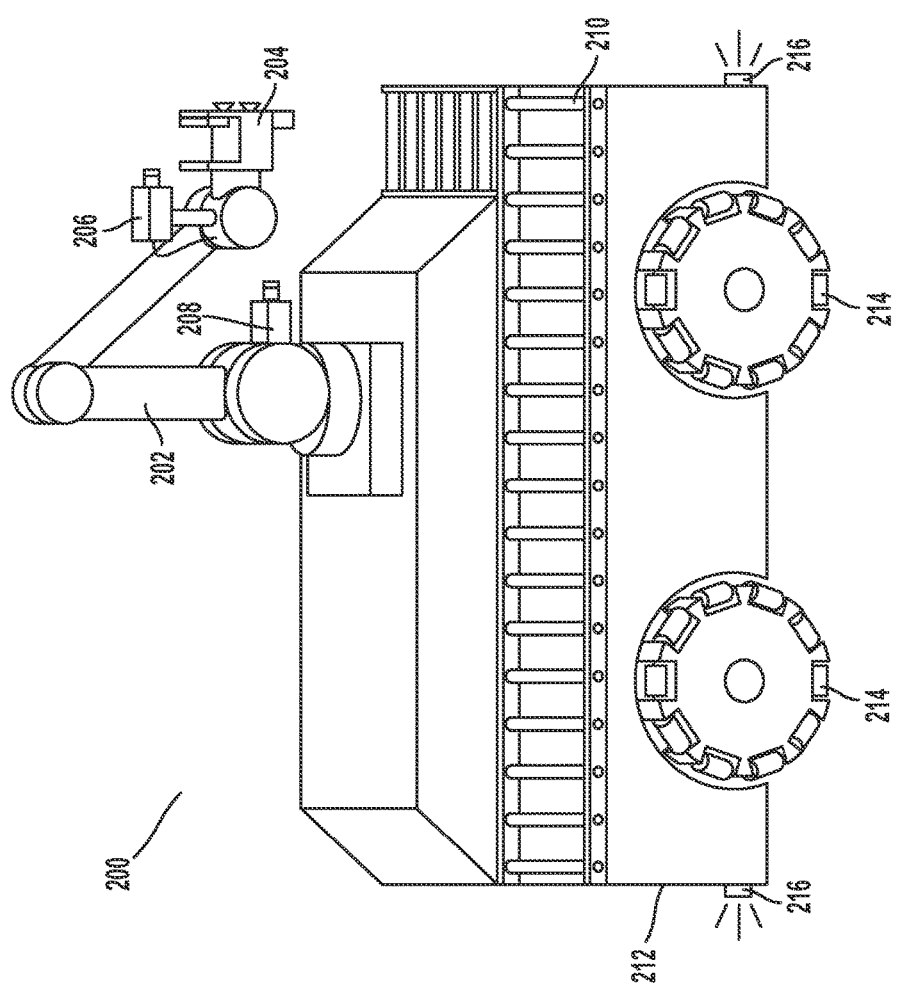
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
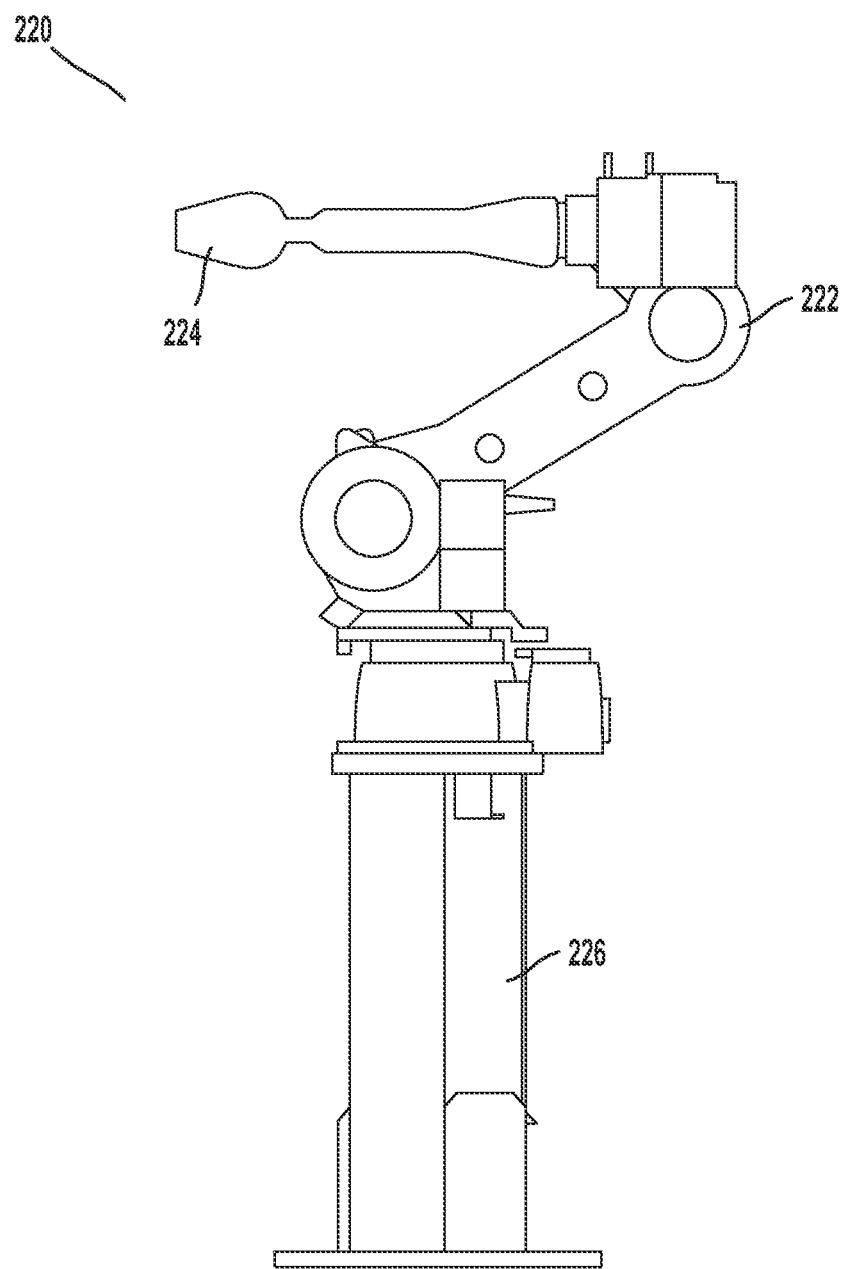
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
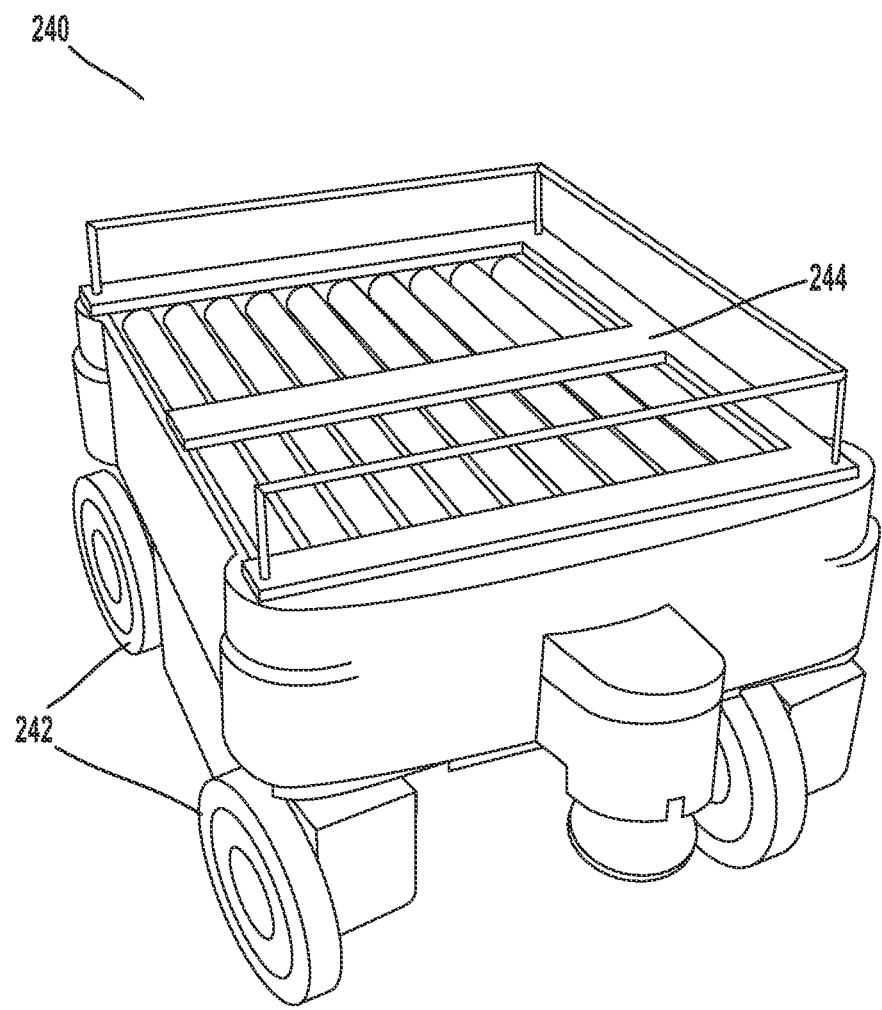
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
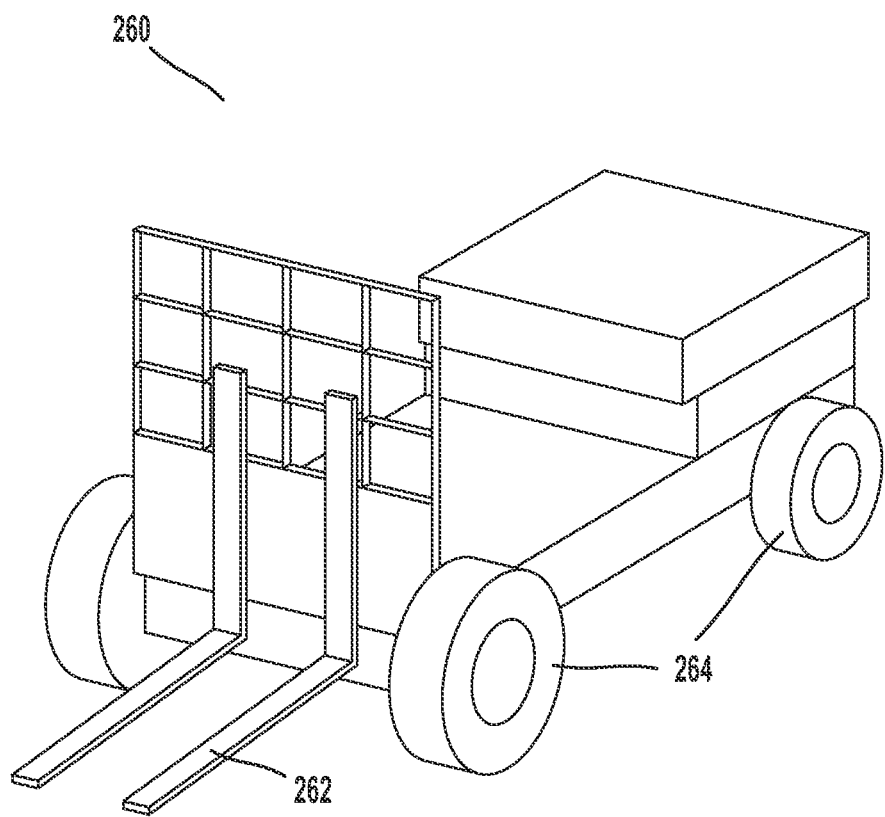
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Figure 3:
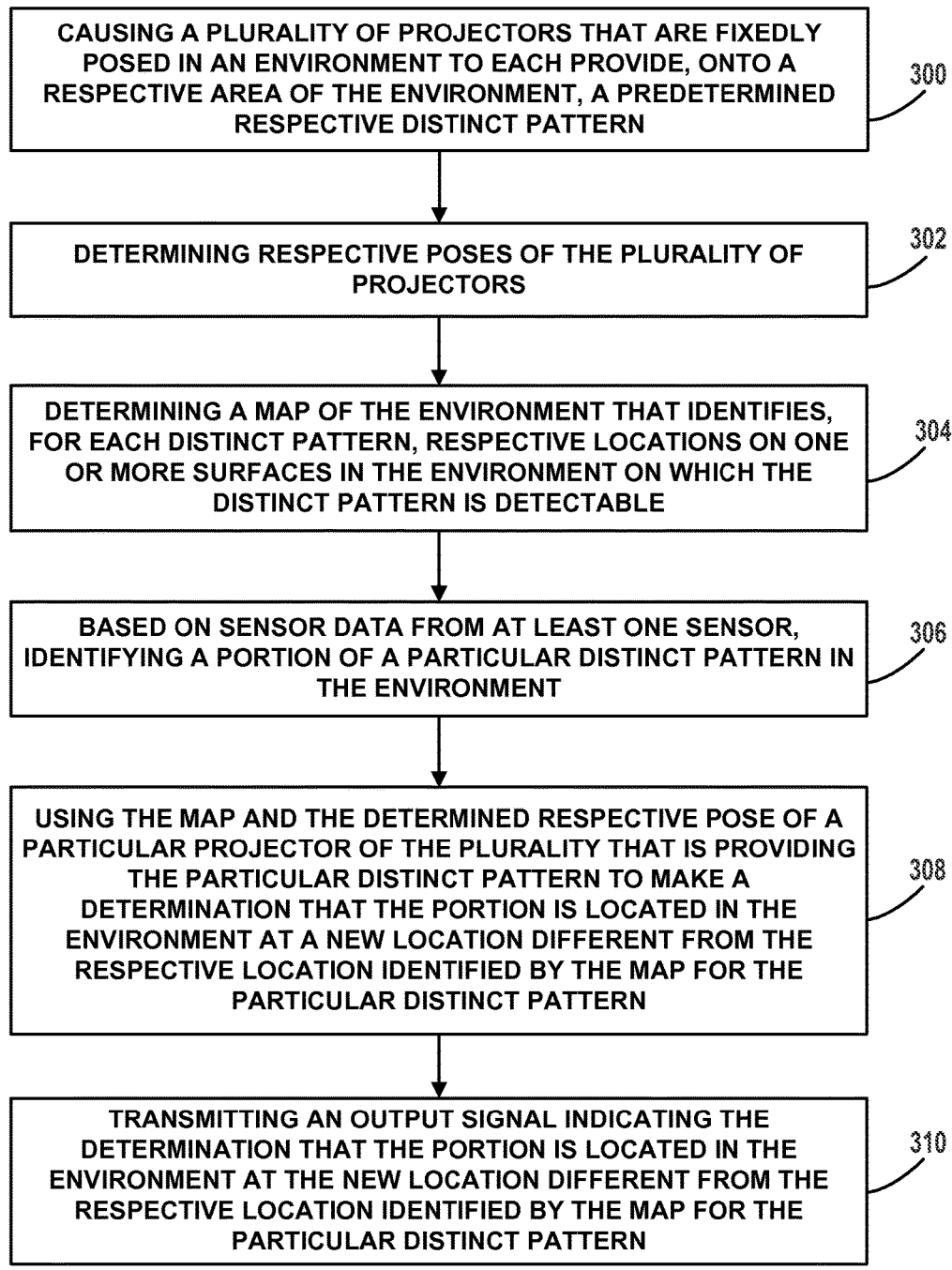
FIG. 3 is a flow chart of an example method, in accordance with at least some implementations described herein.

FIG. 3 is a flow chart of an example method for using projected patterns in an environment to facilitate mapping of the environment. The method shown in FIG. 3 presents an implementation of a method that, for example, could be used with the systems shown in FIGS. 1A, 1B, 2A, 2B, 2C, and 2D, for example, or may be performed by a combination of any components of in FIGS. 1A, 1B, 2A, 2B, 2C, and 2D. In addition, such an implementation of a method could be carried out in accordance with the systems and aspects illustrated in FIGS. 4A, 4B, 5A, and 5B. The method may include one or more operations, or actions as illustrated by one or more of blocks 300-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method and other processes and methods disclosed herein, the flowchart shows operation of one possible implementation of present implementations. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 3 may represent circuitry that is wired to perform the specific logical operations in the process.

Operations of the method, and operations of other methods and processes disclosed herein, may be performed at least in part by a computing system ("the system") configured to control operation of various devices, such as projectors, sensors, and/or static or mobile robotic devices (e.g., AGVs, autonomous fork trucks, pedestal robots, robotic truck loaders/unloaders). However, it should be understood that example methods may be carried out by other entities or combinations of entities (i.e., by a server, or by other computing devices and/or combinations of computing devices), without departing from the scope of the invention.

At block 300, the method involves the system causing a plurality of projectors that are fixedly posed in an environment to each provide, onto a respective area of the environment, a predetermined respective distinct pattern. Within examples, the projectors may take the form of digital projectors or other types of projectors, and may be fixedly attached to a ceiling of a warehouse, walls of a warehouse, and/or another structure from which the projectors have a vantage of the respective areas of the warehouse. Further, depending on factors such as the size of the warehouse and the objects present in the warehouse, the projectors may be separated by predetermined distances in order to control the amount of overlap between the respective areas on which the patterns are projected, if any overlap at all. Still further, one or more of the projectors may have the same or different quantity of degrees of freedom (e.g., each projector has six degrees of freedom). Yet still further, the projectors may be controlled to (or configured to autonomously) project the patterns in a periodic or continuous manner, either synchronously or asynchronously with each other. In some scenarios, for instance, two neighboring (e.g., adjacent) projectors may be controlled to asynchronously project their patterns (e.g., in an offset manner where one pattern is turned "off" while an adjacent pattern is turned "on") in order to avoid two simultaneously-projected patterns overlapping. In other scenarios, however, synchronous projection of patterns (and possible overlap resulting therefrom) may be desired.

Within additional examples, any given projector of the plurality may be configured to provide its respective distinct pattern as infrared (IR) light, ultraviolet (UV) light, or another type of light.

Figure 4A:
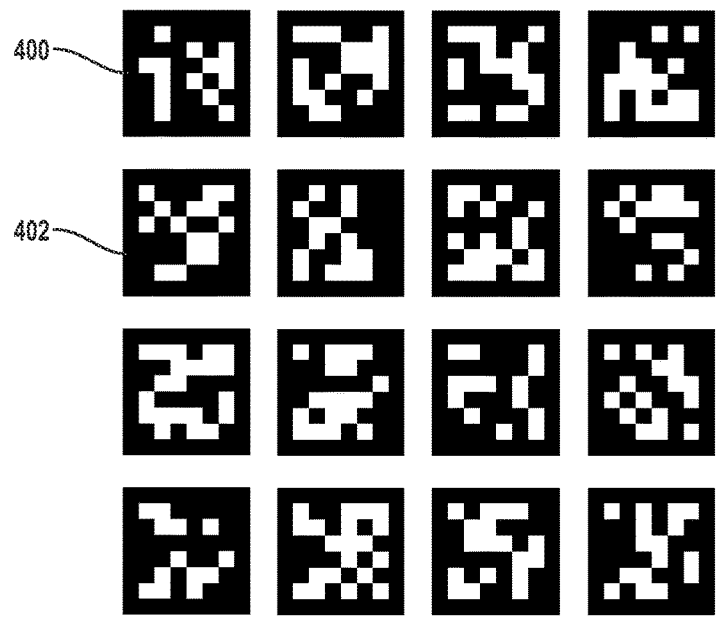
FIGS. 4A and 4B illustrate example projected patterns, in accordance with at least some implementations described herein.

As noted above, each of the distinct patterns may include one or more distinct features, or "sub-patterns," that can be detected on various surfaces. FIG. 4A illustrates an example of such a distinct pattern in the form of a 2D image to be projected by a given fixedly-posed projector. As shown in FIG. 4A, the example pattern may take the form of an arrangement or "grid" of features, such as an arrangement of distinct QR codes including feature 400 and feature 402, among additional features. In practice, each of the distinct QR codes may be provided onto a respective area, such as onto a respective area on a floor of the warehouse and/or onto a respective area on an object present in the warehouse (e.g., a box). Further, based on how far apart the QR codes are arranged in the 2D image of the pattern, two or more QR codes may be provided onto the same surface in the warehouse. It should be noted that in other embodiments, a given pattern may be divided into a plurality of other distinct features, such as a pattern of fractal noise, or other pattern with locally distinct texture. For instance, instead of QR codes, a pattern may be divided into a grid of other types of fiducial markers with a distinct identification.

Figure 4B:
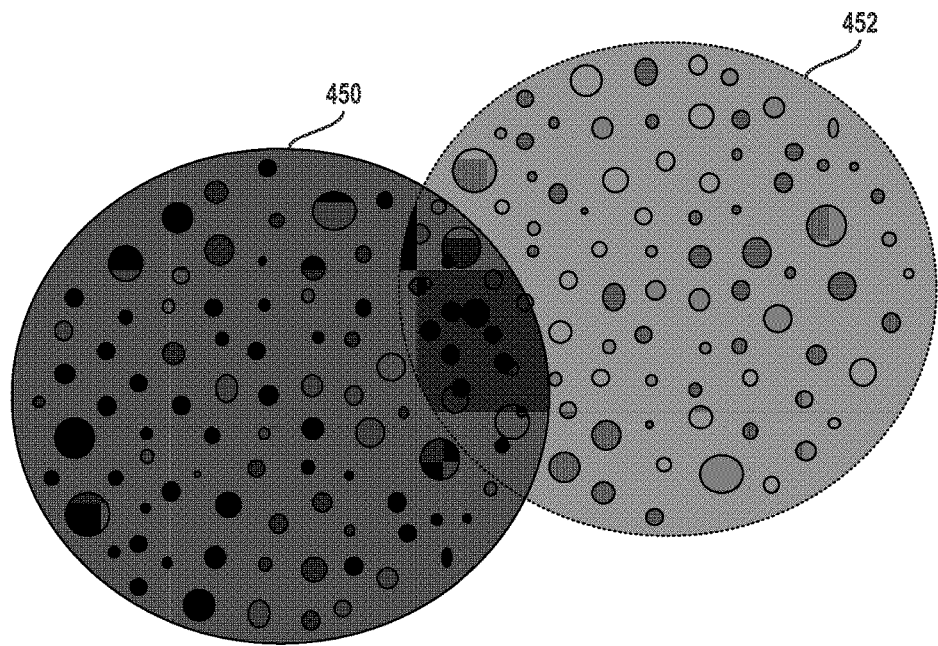

Within additional examples, each distinct pattern may include a respective distinct shape and/or a respective distinct color (i.e., frequency). For instance, FIG. 4B illustrates an example of two overlapping distinct patterns, 450 and 452, each comprised of random dots and each having a distinct color. In addition to projecting patterns with offset timing, factors such as shape and color of the patterns may be used to further enable the system (e.g., sensors configured to detect projected patterns) to distinguish one pattern from another when two or more neighboring projectors provide two or more patterns that overlap with one another. Other factors may contribute to one pattern being distinct from another pattern as well. Within examples, neighboring dots within a pattern of random dots may have different relative sizes, shapes, and/or intensities.

In some scenarios, sensors of the system may more easily recognize the patterns if the projectors provide the patterns on substantially planar surfaces. However, some sensors may be configured to recognize patterns provided on non-planar surfaces.

Furthermore, for the example patterns shown in FIGS. 4A and 4B, and for other example patterns, the system may determine, for each distinct feature of each distinct pattern, a 2D pixel location within the 2D image of the distinct pattern. The system may determine these 2D locations before or after the system causes the projectors to project the patterns, and before or after the system determines the pose of each projector. The system may determine these 2D locations to facilitate the system's determination of where in the warehouse each feature is detectable.

Within examples, the system may engage in a calibration process in which the system uses the projected patterns and other such calibration parameters, such as the poses of the projectors, to determine a map of the environment at issue. Accordingly, referring back to FIG. 3, at block 302, the method involves the system determining respective poses of the plurality of projectors. And at block 304, the method involves determining a map of the environment that identifies, for each distinct pattern, respective locations on one or more surfaces in the environment on which the distinct pattern is detectable.

In particular, as part of this calibration process, the system may determine, at a minimum, and with respect to a common global reference location in the environment: a pose of each projector and the respective locations of each distinct pattern. Further, the system may use at least one camera to facilitate this process, such as at least one monocular camera and/or at least one stereo camera, and may also determine the pose of the at least one camera with respect to the common global reference location as part of the process. The system may have stored a predetermined pose of each projector and/or each camera, or may employ various techniques to determine the poses of the projectors and the camera(s), such as triangulation or other calibration techniques.

The system may determine the respective location (e.g., a 3D location) of each distinct pattern using the poses of the projectors, the pose(s) of the camera(s), and/or the determined 2D pixel locations of each feature discussed above. Given 2D feature correspondences between camera images of the features and the 2D pixel locations of the features within the projected patterns, the system may determine the pose of the camera(s), the pose of the projectors, and/or the 3D location of the surfaces on which each feature is detectable.

Within examples, the system may, for each distinct pattern, cause the camera(s) to capture one or more images of each distinct feature. The camera(s) may include at least one fixedly-posed camera, such as at least one camera fixedly-posed on the ceiling and/or on a wall of the warehouse. Additionally or alternatively, the camera(s) may include at least one moving camera, such as a camera mounted on a robot configured to travel in the environment or on a slide rail structure, and the system may cause the robot or slide rail structure to move in the environment so as to give the at least one moving camera multiple views of the environment from which to capture the one or more images discussed above.

Further, the system may, for each distinct pattern, determine a 2D pixel location of each distinct feature within the distinct pattern (or use predetermined 2D pixel locations). Still further, the system may, for each distinct pattern, use triangulation to determine, for each distinct feature, the respective locations on one or more surfaces in the environment on which the distinct feature is detectable. The triangulation may be between the location of each feature in the one or more images and the 2D pixel location of each feature, and may be performed assuming the pose of the projectors and/or the pose(s) of the camera(s) are known by the system. Additionally or alternatively, other factors may be considered when performing the triangulation.

Moreover, as part of the calibration process, the system may determine a map that identifies the respective locations of the distinct features of each pattern. The map may further identify, for each distinct feature, the projector that is providing the distinct feature. Within examples, the map may take the form of a list of 3D coordinate point locations of the surfaces on which the distinct features are detectable. Additionally or alternatively, the map may take the form of a 2D or 3D model of the environment, such as a 3D virtual reconstruction of the environment. Either type of map may include other information as well, such as the poses of the projectors, the pose(s) of the camera(s) used for calibration, and 3D coordinate point locations and/or a 3D virtual reconstruction of the projectors and/or camera(s).

Figure 5A:
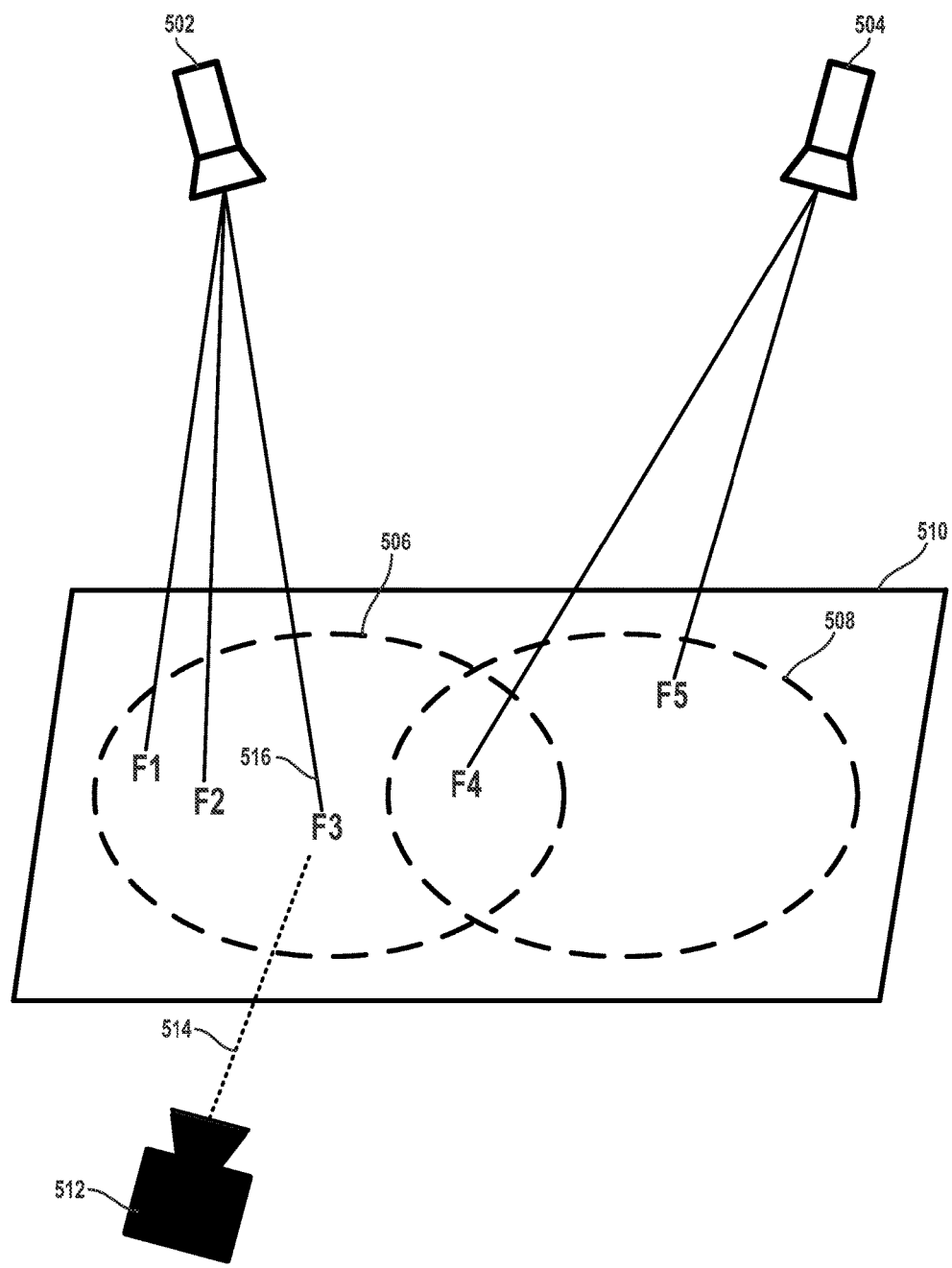
FIG. 5A illustrates an example arrangement in which a calibration process may be performed, in accordance with at least some implementations described herein.

FIG. 5A illustrates an example arrangement in which the calibration process described above may be performed. As shown, FIG. 5A includes a first fixedly-posed projector 502 and a second fixedly-posed projector 504, each providing a distinct pattern (pattern 506 and pattern 508, respectively) onto a floor 510 of the environment. Further, FIG. 5A illustrates three distinct features of pattern 506 (F1, F2, and F3) and two distinct features of pattern 508 (F4 and F5). Still further, FIG. 5A illustrates a representative camera 512 observing the environment. The system may determine and store the pose of the camera 512 for use in performing triangulation to determine the 3D location of features F1, F2, F3, F4, and F5.

In this arrangement, the calibration process may involve determining, with respect to a common global reference location, the respective poses of projectors 502 and 504, and the respective 3D locations of features F1, F2, F3, F4, and F5. Within examples, the system may determine the 3D depth of each of the five features using triangulation between the 2D location of a given feature in one or more images capture by the camera 512 and a 2D location of the given feature within the projected pattern 506. For instance, the system may determine the 3D location of F3 using triangulation between the camera ray 514 of the camera 512 and the projector ray 516 of the first projector 502 that corresponds to the 2D location of F3 within the projected pattern 506.

In practice, some techniques may exist for jointly determining two or more of the calibration parameters noted above, including the respective poses of the projectors, respective poses of the camera(s), motion of the camera(s), and/or the respective locations of the distinct features. For instance, the system may cause a camera to move through the environment (e.g., by way of a moving robot) and apply structure from motion (SfM) optimization (i.e., bundle adjustment) or another such process for estimating 3D structures from 2D image sequences.

As noted above, the map that is determined during the calibration process may enable the system to perform various operations, including determining motion of camera(s) in the environment and detecting changes in the environment over time, such as objects moving into and/or out of areas in the environment on which the distinct patterns are projected. More particularly, because the system has stored the respective locations of various distinct features, as well as the identity and pose of the projectors that are providing each distinct feature, the system can detect when the location of a given distinct feature does not correspond with the map determined during calibration (or any prior map determined/ updated after calibration), and thus that the location of the given distinct feature has changed.

Accordingly, referring back to FIG. 3, at block 306, the method involves the system identifying a portion of a particular distinct pattern in the environment based on sensor data from at least one sensor (e.g., the camera(s) described above, such as camera 512, or other optical sensor(s)). And at block 308, the method involves the system using the map and the determined respective pose of a particular projector of the plurality that is providing the particular distinct pattern to make a determination that the portion is located in the environment at a new location different from the respective location identified by the map for the particular distinct pattern.

Within examples, the system may identify the portion of the particular distinct pattern (and/or portions of any other distinct pattern) using a number of possible feature detection methods, such as edge detection, corner detection, blob detection, ridge detection, and the like.

Within additional examples, the identified portion may include only distinct features that have changed locations in the environment. It should be noted, however, that the identified portion may include both distinct features that have changed locations as well as distinct features that have not changed locations, and thus a determination that the portion has changed locations may amount to a determination that certain distinct features within the portion have changed locations while other distinct features within the portion have not changed locations.

In line with the discussion above with respect to the calibration process, the sensor(s) used by the system to identify the portion may be at least one static or moving camera. For instance, a monocular or stereo camera may be mounted on a robotic device configured to travel in the environment, and the system may cause the robotic device to navigate through the environment and cause the camera to acquire at least one image of the portion.

The system may detect changes in the environment under the assumption that there is a sufficient quantity of distinct features that are static and do not change over time, meaning that during the time the system is determining the pose of the camera(s), such features have not moved to locations different from the locations identified by the map. The distinct features that do not change over a given period of time may be referred to herein as "inliers," and the distinct features that change over the given period of time may be referred to herein as "outliers." In this manner, the system may use the inliers as a reference for determining a pose of the camera(s), such as a static pose of a fixed camera or a changing pose of a camera in motion. In turn, the system may use the pose of the camera(s) as a basis for detecting the presence of outliers in the image(s) acquired by the camera(s). To facilitate this, the system may identify, in addition to the portion (which includes one or more outliers), other portions of the same particular pattern or other patterns (e.g., patterns neighboring the particular pattern) in order to detect inliers and thereby determine the pose of the camera(s).

Within examples, the sensor data may include at least two sequential images of one or more other portions of the distinct patterns, such as portions that include inliers as reference points. Accordingly, the system may determine a pose of the camera with respect to the inliers and/or outliers in the identified portions by performing stereo matching using the images of each portion. Within additional examples, the sensor data may include a single image of one or more distinct features (inliers and/or outliers), and the system may determine a pose of the camera using the single image.

The system may use various techniques to determine the pose of the camera(s) while minimizing reprojection error of the inliers in the camera image(s). Further, the system may use these techniques under the assumption that there are more inliers in the observed portion(s) (i.e., the distinct features in the camera image(s)) of the environment than outliers, and further under the assumption that there is robust correspondence between the 2D locations of the distinct features in the camera image(s) and the 2D pixel locations in the respective projected patterns. Within examples, the system may use least-square optimization with robust M-estimation to determine the pose of the camera(s). Within additional examples, the system may use a random sample consensus—(RANSAC) based perspective-n-point (PnP) method to iteratively estimate, from 3D-2D point correspondences (i.e., a 3D coordinate point of the distinct feature(s) in the map of the environment and a corresponding 2D point observation of the distinct feature(s) in the camera image(s)), a pose of the camera(s).

In scenarios where the sensor data includes a single image, the system may estimate the pose of the camera using 3D-2D point correspondences as discussed above. Additionally or alternatively, the system may estimate the pose of the camera up to an unknown scale factor using a 2D-2D correspondence between the 2D location(s) of the distinct feature(s) in the single camera image and the 2D pixel location(s) in the respective projected pattern(s). The unknown scale factor can be recovered in various ways. For instance, the system can recover the scale factor if the camera is mounted at a height known by the system and the camera has a view of the floor of the environment, or using a camera image of an object in the environment, where the object has a size known by the system.

Within examples, in addition to using the pose of the camera(s), the system may also use the pose of the projector that is projecting the inliers and outliers to detect changes in the environment, including the pose of the projector that is providing the portion of the particular distinct pattern. To facilitate this, the system may refer to the map, correlate the identified inliers and outliers with the respective projector(s) that is/are providing the distinct patterns to which the identified inliers and outliers belong, and in turn determine the respective pose(s) of those projectors. Further, in line with the discussion above, if the inliers and outliers are part of a pattern with a distinct color, shape, or other characteristic, the system may use that distinct characteristic as a basis for determining the respective projector(s) that is/are providing the distinct patterns to which the identified inliers and outliers belong, perhaps by using sensors and corresponding processing steps configured for use in detecting certain colors, shapes, etc., for instance.

Figure 5B:
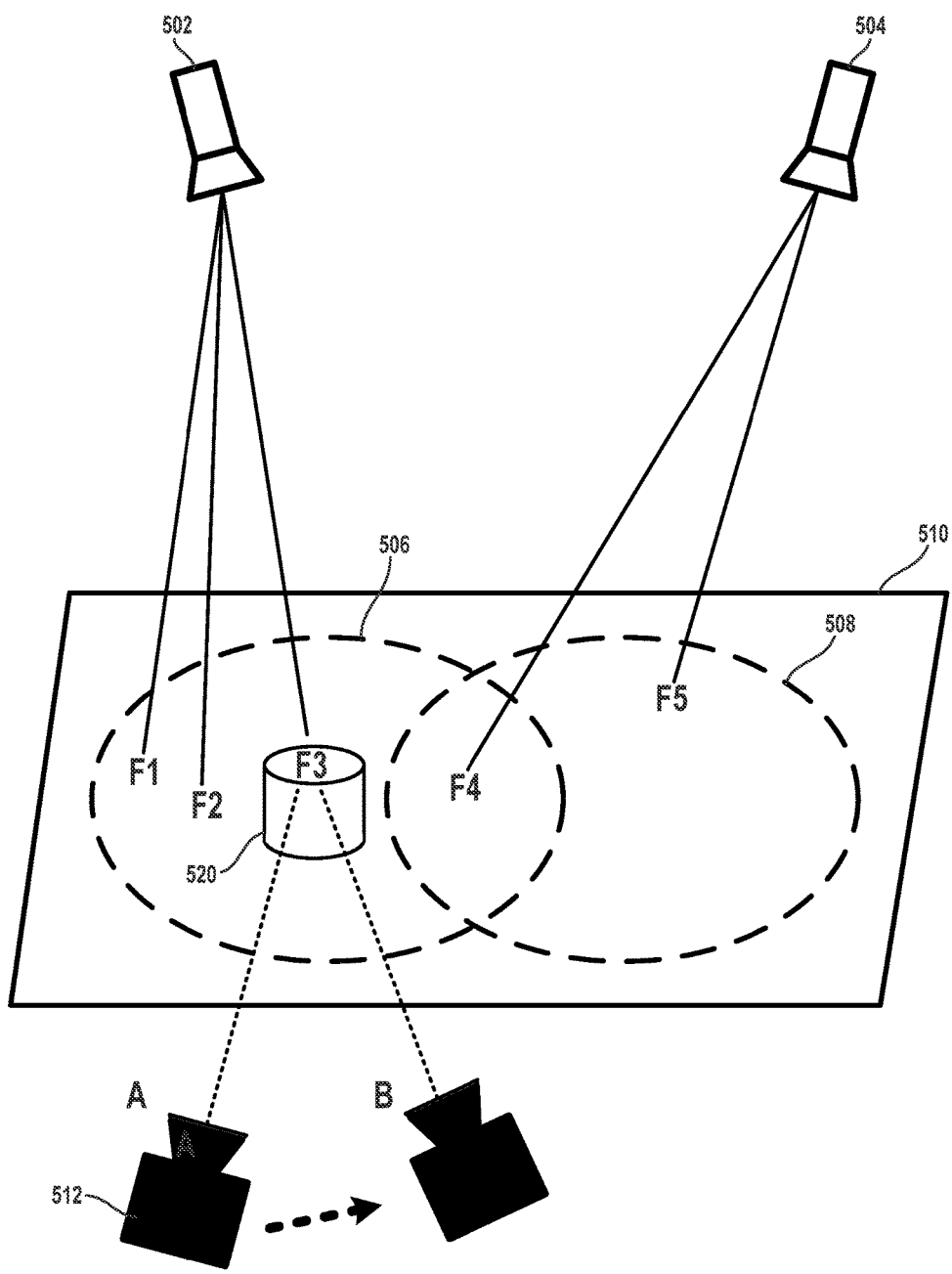
FIG. 5B illustrates an example arrangement in which a change to an environment may be detected, in accordance with at least some implementations described herein.

FIG. 5B illustrates an example of a changed environment. In particular, FIG. 5B illustrates an object 520 that has been placed at the area on the floor 510 on which feature F3 was previously detectable. Due to the presence of the object 520, F3 is now detectable on the top surface of the object, and is thus an outlier. To facilitate detection of the outlier, the camera 512 may be moved through the environment from position A to position B as shown as the camera captures images of F3, as well as images of nearby inliers such as F1, F2, and F4 for reference. Using the images of the inliers and the respective locations of the first and second projectors 502, 504, the system may determine the pose of the camera 512 as the camera moves from position A to position B. The determined poses of the camera 512 may thus enable the system to determine the new location of F3.

Given at least the pose(s) of the camera(s) with respect to the particular projector that is providing the particular pattern to which the identified portion belongs, the system may then determine the location of the identified portion using triangulation between the 2D pixel location of the identified portion in the particular pattern and the 2D location of the identified portion on the camera image(s). By way of example, referring to FIG. 5B, the system may use the poses of the camera 512 at positions A and B to triangulate between the projector ray and the respective camera rays of the first projector 502 and thus determine the new location of F3. The system may then compare the determined location of the identified portion (e.g., of F3) with the map to make the determination that the identified portion is located in the environment at the new location different from the respective location identified by the map for the particular distinct pattern (e.g., pattern 506).

Within examples, the system may observe the environment over a given period of time, determine the presence of outliers, and cluster the outliers into different groups. One such group may include outliers that appear to move from image to image, which indicate (and can be used by the system to detect) motion in the environment, such as an object or human passing through the environment.

Further, by contrast, another such group may include outliers representative of changes to the environment that occurred and have remained changed for a threshold period of time. For instance, when the initial map is determined during calibration, a portion of a pattern may be provided onto an area of the floor of the warehouse. Later, a pallet of boxes may be placed in the area and the portion of the pattern may then be detectable on a top surface of the pallet of boxes. Within a certain period of time of the box being moved into the area, the system may classify the portion as an outlier indicative of motion in the scene. However, once a threshold period of time expires (e.g., thirty seconds, one minute, an hour, etc.), the system may then classify the portion as an outlier indicative of long lasting change, and may even update the map with a 3D coordinate location of the portion and/or with a 3D virtual reconstruction of the pallet of boxes to reflect this change.

Still further, yet another group of outliers may include outliers that may no longer be visible and may not be visible for a given period of time. This may occur for various reasons, such as when one or more distinct features are occluded from view of the camera(s) and/or when an object with a non-planar surface being placed at an area of the environment such that the system cannot detect the distinct features at that area on the non-planar surface. In a manner similar to that described above with respect to the long-lasting changes to the environment, the system may update the map to indicate the absence of such features after a threshold period of time has expired since initially detecting the absence of such features (e.g., thirty seconds, one minute, an hour, etc.). Other groups may be used for clustering outliers as well.

Moreover, the system may use the determined new location of the portion to update the map, such as by determining a three-dimensional (3D) virtual reconstruction of one or more surfaces in the environment at the new location of the portion and on which the portion is detectable. Within examples, with respect to the environment shown in FIG. 5B, the system may use the determined locations of outliers such as F3 and/or the determined locations of inliers such as F1, F2, etc. to periodically or continuously update the map. For instance, the system may update a list of 3D coordinate points of the distinct features to identify new 3D coordinate points of outliers (e.g., replace the stored location of F3 with the new location), or by updating a 3D reconstruction of the environment with a 3D reconstruction of the surface(s) on which the outliers are located (e.g., virtually reconstruct object 520).

Referring again to FIG. 3, at block 310, the method involves the system transmitting an output signal indicating the determination that the portion is located in the environment at the new location different from the respective location identified by the map for the particular distinct pattern. In some scenarios, the system may then transmit the output signal. By way of example, as noted above, the system may transmit the output signal to a robotic device so as to inform the robotic device of the change, and may additionally transmit instructions to the robotic device to cause the robotic device to interact with or avoid the new location. For instance, with respect to FIG. 5B, the system may cause a robotic device to travel to the area on which pattern 506 is projected, pick up object 520, and move it to another location in the environment. As another example, the system may transmit the output signal to a computing device (e.g., a smartphone, tablet computer, laptop computer, etc.) as a notification that the environment has changed. Further, the system may also transmit to the computing device data representative of the change, such as an updated 3D reconstruction of the environment for display on the computing device.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method performed by a computing system having one or more processors and a memory, the method comprising:
    causing a plurality of projectors that are fixedly posed in an environment to each provide, onto a respective area of the environment, a predetermined respective distinct pattern;
    determining respective poses of the plurality of projectors;
    determining a map of the environment that identifies, for each distinct pattern, respective locations on one or more surfaces in the environment on which the distinct pattern is detectable;
    based on sensor data from at least one sensor, identifying a portion of a particular distinct pattern in the environment;
    using the map and the determined respective pose of a particular projector of the plurality that is providing the particular distinct pattern to make a determination that the portion is located in the environment at a new location different from the respective location identified by the map for the particular distinct pattern; and
    transmitting an output signal indicating the determination that the portion is located in the environment at the new location different from the respective location identified by the map for the particular distinct pattern.

2. The method of claim 1, wherein the respective locations on the one or more surfaces in the environment are represented in the map as respective three-dimensional (3D) locations.

3. The method of claim 1, wherein the map is a three-dimensional (3D) virtual reconstruction of the environment.

4. The method of claim 1, wherein the at least one sensor includes one or more cameras fixedly posed on a ceiling of the environment, the method further comprising:
    determining respective poses of the one or more cameras;
    using the determined respective poses of the one or more cameras to determine the map; and
    using the determined respective poses of the one or more cameras to make the determination that the portion is located in the environment at the new location different from the respective location identified by the map for the particular distinct pattern,
    wherein determining the respective poses of the plurality of projectors, determining respective poses of the one or more cameras, and determining the map are performed as part of an initial calibration process before making the determination that the portion is located in the environment at the new location.

5. The method of claim 1, wherein the at least one sensor includes a camera coupled to a robotic device configured to travel in the environment, and wherein the sensor data includes at least two sequential images of one or more other portions of the distinct patterns acquired by the camera as the robotic device travels in the environment, the method further comprising:
    determining a pose of the camera by performing stereo matching using the at least two sequential images of the one or more other portions; and
    using the determined pose of the camera to make the determination that the portion is located in the environment at the new location different from the respective location identified by the map for the particular distinct pattern.

6. The method of claim 1, wherein each distinct pattern includes a respective distinct shape, the method further comprising:
    using the respective distinct shape of the particular distinct pattern to identify the particular projector of the plurality that is providing the particular distinct pattern.

7. The method of claim 1, wherein causing the plurality of projectors that are fixedly posed in the environment to each provide, onto the respective area of the environment, the predetermined respective distinct pattern comprises causing the plurality of projectors to each provide the predetermined respective distinct pattern with a respective distinct color, and wherein the at least one sensor is configured to detect the respective distinct colors, the method further comprising:
    using the respective distinct color of the particular distinct pattern to identify the particular projector of the plurality that is providing the particular distinct pattern.

8. A computing system comprising:
    a plurality of projectors that are fixedly posed in an environment;
    at least one processor; and
    data storage comprising instructions executable by the at least one processor to cause the computing system to perform operations comprising:
    causing the plurality of projectors to each provide, onto a respective area of the environment, a predetermined respective distinct pattern;
    determining respective poses of the plurality of projectors;
    determining a map of the environment that identifies, for each distinct pattern, respective locations on one or more surfaces in the environment on which the distinct pattern is detectable;
    based on sensor data from at least one sensor, identifying a portion of a particular distinct pattern in the environment;
    using the map and the determined respective pose of a particular projector of the plurality that is providing the particular distinct pattern to make a determination that the portion is located in the environment at a new location different from the respective location identified by the map for the particular distinct pattern; and transmitting an output signal indicating the determination that the portion is located in the environment at the new location different from the respective location identified by the map for the particular distinct pattern.

9. The computing system of claim 8, the operations further comprising:

updating the map to identify the new location.

10. The computing system of claim 8, the operations further comprising:

determining a three-dimensional (3D) virtual reconstruction of one or more surfaces in the environment at the new location of the portion and on which the portion is detectable.

11. The computing system of claim 8, wherein each distinct pattern is divided into a plurality of distinct detectable sub-patterns, and wherein the portion includes at least one distinct sub-pattern of the particular distinct pattern.

12. The computing system of claim 11, wherein each distinct sub-pattern is a distinct QR code.

13. The computing system of claim 8, wherein each distinct pattern is divided into a plurality of distinct detectable sub-patterns, and wherein determining the map comprises, for each distinct pattern:

causing one or more cameras to capture one or more images of each distinct sub-pattern;

determining a two-dimensional (2D) location of each distinct sub-pattern within the respective distinct pattern; and using triangulation between the one or more images and the determined 2D locations to determine, for each distinct sub-pattern, respective locations on one or more surfaces in the environment on which the distinct sub-pattern is detectable.

14. The computing system of claim 13, wherein the one or more cameras are coupled to a robotic device configured to travel in the environment, and wherein causing the one or more cameras to capture the one or more images of each distinct sub-pattern comprises causing (i) the robotic device to travel in the environment and (ii) causing the one or more cameras to capture the one or more images of each distinct sub-pattern as the robotic device travels in the environment.

15. A non-transitory computer readable medium having stored thereon instructions that, upon execution by a computing system, cause the computing system to perform operations comprising:

causing a plurality of projectors that are fixedly posed in an environment to each provide, onto a respective area of the environment, a predetermined respective distinct pattern;

determining respective poses of the plurality of projectors;

determining a map of the environment that identifies, for each distinct pattern, respective locations on one or more surfaces in the environment on which the distinct pattern is detectable;

based on sensor data from at least one sensor, identifying a portion of a particular distinct pattern in the environment;

using the map and the determined respective pose of a particular projector of the plurality that is providing the particular distinct pattern to make a determination that the portion is located in the environment at a new location different from the respective location identified by the map for the particular distinct pattern; and transmitting an output signal indicating the determination that the portion is located in the environment at the new location different from the respective location identified by the map for the particular distinct pattern.

16. The non-transitory computer readable medium of claim 15, wherein the plurality of projectors are fixedly posed on a ceiling of the environment and separated by predetermined distances.

17. The non-transitory computer readable medium of claim 15, wherein transmitting the output signal comprises transmitting, to at least one robotic device, the output signal along with instructions to cause the at least one robotic device to perform an action at the new location.

18. The non-transitory computer readable medium of claim 15, wherein the at least one sensor includes one or more cameras fixedly posed on a ceiling of the environment, the operations further comprising:

determining respective poses of the one or more cameras;

using the determined respective poses of the one or more cameras to determine the map; and using the determined respective poses of the one or more cameras to make the determination that the portion is located in the environment at the new location different from the respective location identified by the map for the particular distinct pattern, wherein determining the respective poses of the plurality of projectors, determining respective poses of the one or more cameras, and determining the map are performed as part of an initial calibration process before making the determination that the portion is located in the environment at the new location.

19. The non-transitory computer readable medium of claim 15, wherein the at least one sensor includes a camera coupled to a robotic device configured to travel in the environment, and wherein the sensor data includes at least two sequential images of one or more other portions of the distinct patterns acquired by the camera as the robotic device travels in the environment, the operations further comprising:

determining a pose of the camera by performing stereo matching using the at least two sequential images of the one or more other portions; and using the determined pose of the camera to make the determination that the portion is located in the environment at the new location different from the respective location identified by the map for the particular distinct pattern.

20. The non-transitory computer readable medium of claim 15, wherein the respective locations on the one or more surfaces in the environment are represented in the map as respective three-dimensional (3D) locations.

* * * * *